US009940920B2

(12) United States Patent
Kuczynski et al.

(10) Patent No.: US 9,940,920 B2
(45) Date of Patent: Apr. 10, 2018

(54) MANAGING A SET OF DEVICES USING A SET OF ACOUSTIC EMISSION DATA

(71) Applicant: International Business Machines Corporation, Armonk, NY (US)

(72) Inventors: Joseph Kuczynski, North Port, FL (US); Kevin M. O'Connell, Rochester, MN (US); Chelsie M. Peterson, Dexter, MN (US); Mark D. Plucinski, Toms River, NJ (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/083,234

(22) Filed: Mar. 28, 2016

(65) Prior Publication Data
US 2017/0278505 A1 Sep. 28, 2017

(51) Int. Cl.
*G06F 17/00* (2006.01)
*G10K 15/00* (2006.01)
*G01H 7/00* (2006.01)

(52) U.S. Cl.
CPC .............. *G10K 15/00* (2013.01); *G01H 7/00* (2013.01); *G10K 2210/109* (2013.01)

(58) Field of Classification Search
CPC ....... G10K 2210/104; G10K 2210/105; G10K 2210/1054; G10K 2210/109; G10K 2210/11; G10K 15/00; G01H 7/00; G05B 23/0218; G05B 23/0205; G01M 13/045; G01M 13/028; G06F 11/008; G06F 1/20; G06F 1/203; G06F 1/206; G01N 29/14; H05K 7/2019
See application file for complete search history.

(56) References Cited

U.S. PATENT DOCUMENTS 6,396,688 B1 * 5/2002 Davies .................. G06F 1/20
361/51
7,142,125 B2 11/2006 Larson et al.
8,893,980 B2 11/2014 Scott et al.
(Continued)

FOREIGN PATENT DOCUMENTS

EP 1731893 A1 12/2006

OTHER PUBLICATIONS

Oh et al., "Estimation of Fan Bearing Degradation Using Acoustic Emission Analysis and Mahalanobis Distance", Center for Advanced Life Cycle Engineering (CALCE), University of Maryland, <http://www.prognostics.umd.edu/calcepapers/11_Oh%20-%20Estimation%20Of%20Fan%20Bearing%20Degradation%20Using%20Acoustic%20Emission%20Analysis%20And%20Mahalonabis%20Distance.pdf>.
(Continued)

*Primary Examiner* — Md S Elahee
*Assistant Examiner* — David Siegel
(74) *Attorney, Agent, or Firm* — Alexander G. Jochym

(57) ABSTRACT

Disclosed aspects relate to managing a set of devices using a set of acoustic emission data which indicates device-health of the set of devices. The set of devices is coupled with a set of acoustic emission sensors. Based on the set of acoustic emission data, a triggering event related to a first device of the set of devices is detected. Using the set of acoustic emission data, an event response which includes a first modification with respect to operation of the first device is determined. Establishment of the event response which includes the first modification with respect to operation of the first device is initiated.

19 Claims, 6 Drawing Sheets

(56) References Cited

U.S. PATENT DOCUMENTS

| | | |
|---|---|---|
| 2002/0101715 A1 | 8/2002 | Osecky et al. |
| 2005/0007041 A1 | 1/2005 | Liu |
| 2005/0262394 A1* | 11/2005 | Yasukawa ........... G06F 11/0733 714/23 |
| 2006/0232914 A1 | 10/2006 | Hori et al. |
| 2007/0150236 A1 | 6/2007 | Warizaya |
| 2007/0153443 A1 | 7/2007 | Lyons et al. |
| 2008/0019220 A1* | 1/2008 | Sutardja ............... G11B 5/5526 369/1 |
| 2013/0076286 A1* | 3/2013 | Patton .................... F16F 15/00 318/460 |
| 2014/0100709 A1* | 4/2014 | Sakurai ................. G05D 23/19 700/300 |
| 2014/0324385 A1 | 10/2014 | Sun et al. |

OTHER PUBLICATIONS

Xi et al., "A copula-basedsamplingmethodfordata-drivenprognostics", Reliability Engineering and System Safety 132 (2014) pp. 72-82, <http://www-personal.umd.umich.edu/~zxi/RESS_printed.pdf>.

* cited by examiner

MANAGING A SET OF DEVICES USING A SET OF ACOUSTIC EMISSION DATA

BACKGROUND

This disclosure relates generally to computer systems and, more particularly, relates to managing a set of devices using a set of acoustic emission data. The amount of data that needs to be managed by enterprises is increasing. Management of a set of devices may be desired to be performed as efficiently as possible. As data needing to be managed increases, the need for management efficiency may increase.

SUMMARY

Aspects of the disclosure relate to utilizing an acoustic emission signal from devices to predict device-life. A set of devices may be coupled with a set of acoustic emission sensors. Based on analysis of sensed information, a feature such as operating speed can be adjusted to manage individual device-life while maintaining sufficient system functionality. Accordingly, aspects described herein can predict remaining device-life and balance device workload to extend an overall-life of many/all devices.

Aspects of the disclosure relate to managing a set of devices using a set of acoustic emission data which indicates device-health of the set of devices. Based on the set of acoustic emission data, a triggering event related to a first device of the set of devices is detected. Using the set of acoustic emission data, an event response which includes a first modification with respect to operation of the first device is determined. Establishment of the event response which includes the first modification with respect to operation of the first device is initiated.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
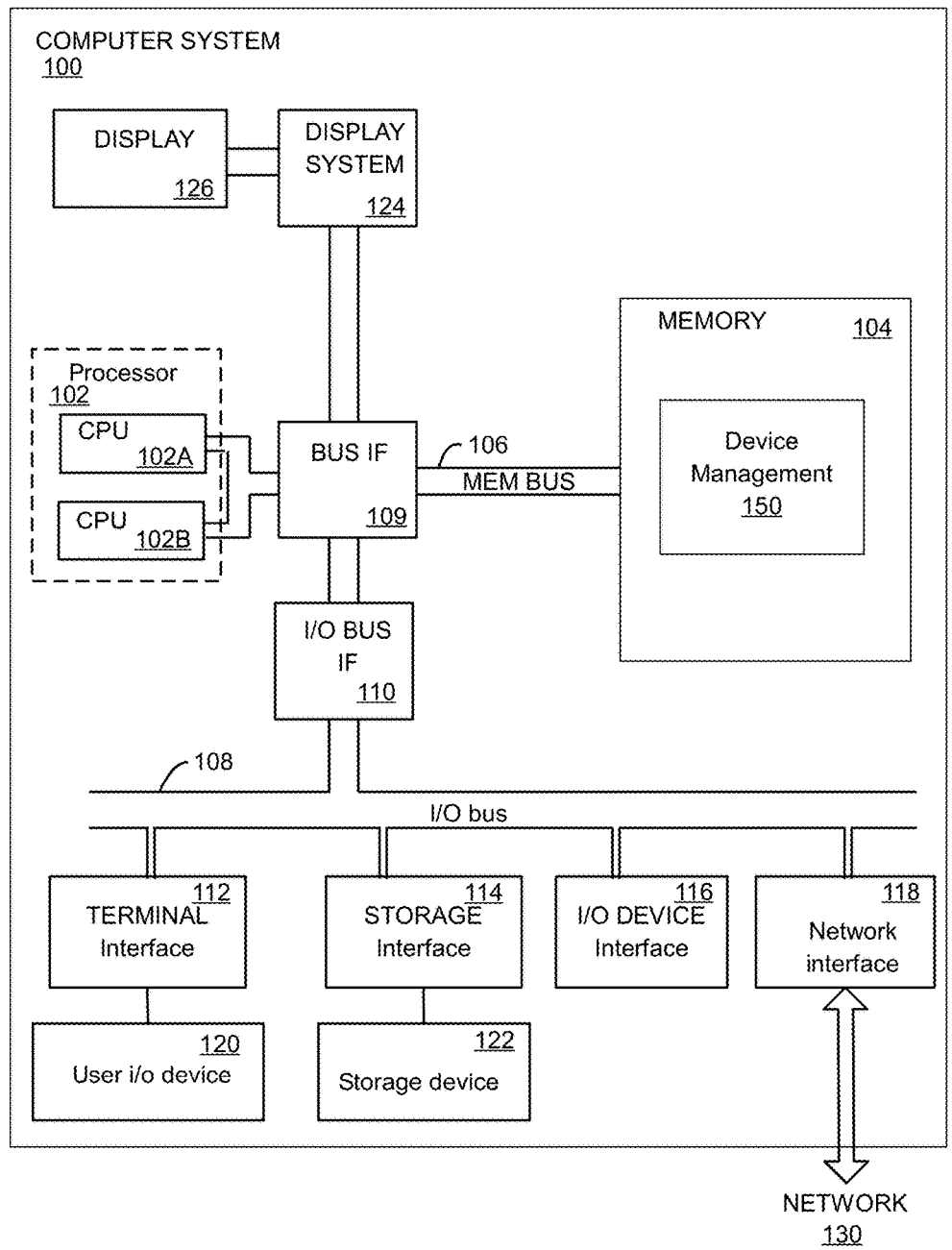
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure utilize an acoustic emission signal from devices (e.g., fans) to predict device-life (e.g., fan-life/health). Based on dynamic/real-time analysis, a feature such as operating speed can be adjusted to manage individual device-life while maintaining sufficient system functionality (e.g., cooling). For instance, for a generic blade server (e.g., 9119-MHE) configuration, if the acoustic emission from a far rightward fan were determined to be representative of a decreased lifetime, then the right-side fan revolutions per minute could be decreased while coordinating a (simultaneous) ramp-up of the revolutions per minute of one or more of the remaining fans (e.g., decreasing speed of a first fan and increasing speed of a second fan). Accordingly, the methodology described herein can predict remaining device-life and balance device workload to extend an overall-life of many/all devices (thereby reducing a number of service actions and a likelihood of device-failure).

Various devices (e.g., fans) may exhibit unacceptable failure rates when a standard failure specification is just barely met (or not met at all). Also, device lifetime can be distributed about a mean with some devices failing at much shorter times than others. Existing methods to predict, for example, fan failure may not be specific. For instance, a prediction may be made that one in every one-hundred fans will fail prematurely, but predicting which exact fan that is presents a greater challenge. Accordingly, predicting specific device health-status, challenges, or failures may provide assorted benefits.

An acoustic emission sensor can be fitted to each individual device. In the case of a fan, a petro-wax may be used to adhesively bond a transducer to the plastic frame of the fan. Using the acoustic emission from an individual device, the feedback may be amplified and processed. Analysis of the acoustic emission from a set of devices may be compared to both individual device performance as well as from the actual device configuration in the system. The acoustic emission from the devices may be determined empirically. To illustrate, a particular device can be induced to fail early by removing all or a portion of grease. As the device begins to exhibit wear of the bearings, the acoustic emission from that device may change (as may the other acoustic emissions from the other devices). As such, the change in acoustic emission from the set of devices under these conditions may be used manage device-health or to predict device-life. Accordingly, the acoustic emission signal/signature/data may be used to manage device-health, predict device-life, or change an operating features/speed of a particular device.

Aspects of the disclosure include a system, a computer program product, or a method for managing a set of devices using a set of acoustic emission data. The set of devices is coupled with a set of acoustic emission sensors. The set of acoustic emission data indicates device-health of the set of devices. Based on the set of acoustic emission data, a triggering event is detected. The triggering event relates to a first device of the set of devices. Using the set of acoustic emission data, an event response is determined. The event response includes a first modification with respect to operation of the first device. In embodiments, the event response include a second modification with respect to a second device of the set of devices. Establishment of the event response is initiated (e.g., initiating establishment of the first modification with respect to operation of the first device).

In embodiments, the set of acoustic emission data includes dynamic information. In various embodiments, using the set of acoustic emission sensors, the set of devices is monitored. With respect to the set of devices, the set of acoustic emission data is captured accordingly. In embodiments, the triggering event includes a threshold difference between a first acoustic emission data value of the first device and a benchmark acoustic emission data value. In certain embodiments, determining the event response includes comparing the set of acoustic emission data with a set of profile data, computing an expected service-life of the first device, and identifying the first modification with respect to operation of the first device (e.g., to retool the expected service-life of the first device).

In embodiments, the event response includes adjusting device(s) and storing change information. In certain embodiments, modification(s) may include a first orientation of the first modification which conflicts-with a second orientation of the second modification (e.g., decreasing a first setting/speed of a first cooling fan and increasing a second setting/speed of a second cooling fan so as to extend service-life of the first cooling fan while providing limited overall cooling sacrifice). In other embodiments, modification(s) may include a first orientation of the first modification which agrees-with a second orientation of the second modification (e.g., decreasing a first setting/speed of a first cooling fan and decreasing a second setting/speed of a second cooling fan so as to extend service-life of the second cooling fan due to an expectation it will incur similar wear as the first cooling fan). Altogether, aspects of the disclosure may have performance or efficiency benefits (e.g., wear-rate, service-length, flexibility, load balancing, responsiveness, high availability, resource usage, productivity).

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a device management application 150. In embodiments, the device management application 150 may include instructions or statements that execute on the processor 102 or instructions or statements that are interpreted by instructions or statements that execute on the processor 102 to carry out the functions as further described below. In certain embodiments, the device management application 150 is implemented in hardware via semiconductor devices, chips, logical gates, circuits, circuit cards, and/or other physical hardware devices in lieu of, or in addition to, a processor-based system. In embodiments, the device management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122

(which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
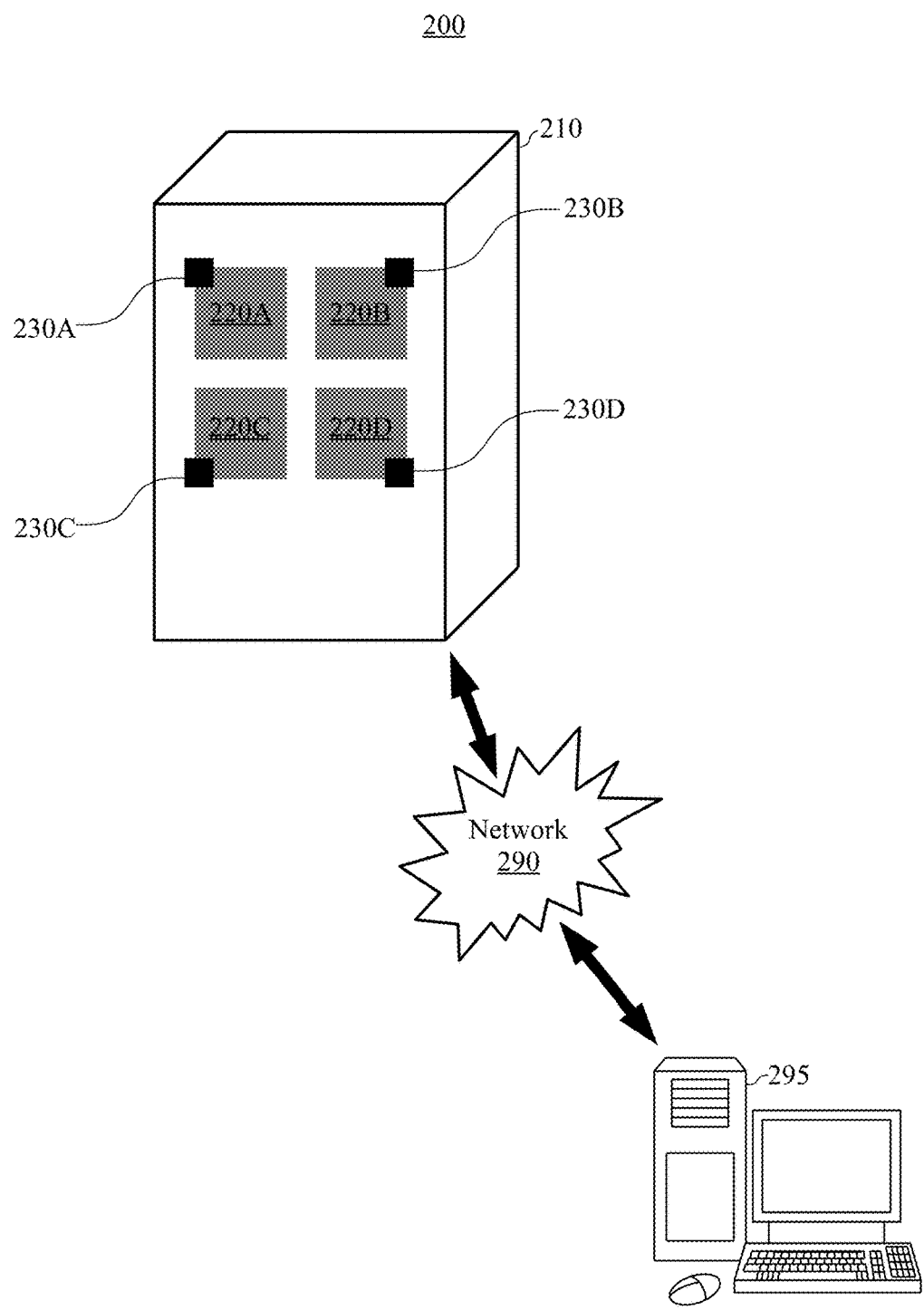
FIG. 2 is a diagrammatic illustration of a set of devices, according to embodiments.

FIG. 2 is a diagrammatic illustration of a set of devices 220, according to embodiments. The set of (one or more) devices 220A, 220B, 220C, 220D may be coupled with a set of acoustic emission sensors 230A, 230B, 230C, 230D (e.g., one or more transducers). Each device may have a corresponding sensor (e.g., to measure an acoustic emission from a bearing of a device). In certain embodiments, the sensors may be arranged to be physically separate from one another (see FIG. 2). In other embodiments, the sensors may be arranged to be clustered together (e.g., each sensor in the opposite corner of its device in FIG. 2). In various embodiments, the sensors may be arranged to be physically in the same location on each device (e.g., all in the same corner, all in the middle, all placed with respect to a particular component of the device). Accordingly, in embodiments, sensed acoustic emissions (e.g., pitch, frequency) may be different based on the sensor placement.

The set of devices 220 and the set of acoustic emission sensors 230 may be part of a device system 210 (e.g., a server having a number of cooling fans and corresponding sensors). Computer system 295 may be linked with one or more aspects of the device system 210 (e.g., one or more sensors, a sensor controller) via network 290 to predict a failure or decreased performance/efficiency of the set of devices 220. Accordingly, the set of devices 220 may have to undergo a speed adjustment, replacement of at least one device, or a notification for user action. Depicted is an illustrative configuration, various other possibilities are contemplated and considered.

Figure 3:
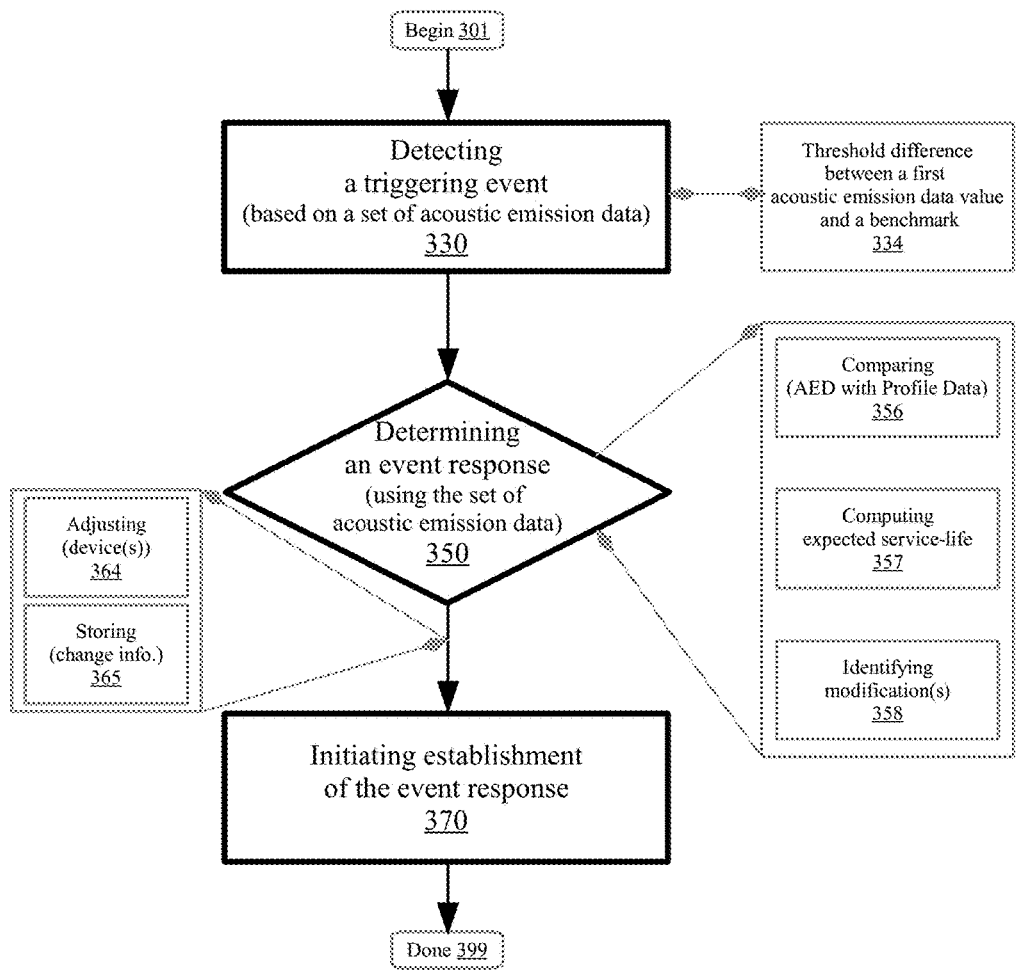
FIG. 3 is a flowchart illustrating a method for managing a set of devices using a set of acoustic emission data, according to embodiments.

FIG. 3 is a flowchart illustrating a method 300 for managing a set of devices using a set of acoustic emission data, according to embodiments. The set of devices is coupled with a set of acoustic emission sensors. The set of acoustic emission data indicates device-health (e.g., wear/deterioration existence/stage, nature of the wear) of the set of devices. The method 300 may begin at block 301.

At block 330, a triggering event is detected. The triggering event relates to a first device of the set of devices, and may be detected by a remote computer system or a sensor controller. Detecting can include receiving (e.g., from a sensor, from a sensor controller) or observing (e.g., based on input data or usage/utilization). Detection may be based on the set of acoustic emission data. The acoustic emission data may have data for the set of devices which correlates with amplitude (e.g., signal level such as minimum/mean/median/quartile/maximum), frequency (e.g., how often an identified level is reached over a period of time), energy (e.g., signal strength, total/absolute usage), count (e.g., a number of times of an occurrence), or timing (e.g., duration, time of strengthening/weakening). The triggering event can include achieving an amplitude criterion, a frequency criterion, an energy criterion, a count criterion, or a temporal criterion with respect to the acoustic emission data.

In embodiments, the triggering event may include a threshold difference between a first acoustic emission data value of the first device and a benchmark acoustic emission data value at block 334. For example, if the benchmark acoustic emission data value includes a benchmark scaled amplitude of 2 (e.g., on a scale of 0 to 10), and first acoustic emission data value of the first device includes a first scaled amplitude of 7, a threshold difference scaled amplitude of 4 may result in a trigger (e.g., 7−2=5>4) whereas a threshold difference scaled amplitude of 6 may not result in a trigger (e.g., 7−2=5<6). Various scales or weightings may be utilized.

At block 350, an event response is determined. Determining may include identifying, resolving, or computing. The determination may be made using the set of acoustic emission data. For instance, the set of acoustic emission data may be utilized in order to identify a particular device for modification which may lead to a relative decrease frequency/energy of an acoustic signal/noise. The event response includes a first modification with respect to operation of the first device (which has the triggering event). Modifications can include various changes to parameters, input values, settings, configurations, or arrangements. For example, an operating speed change (e.g., downward) for a challenged device or a replacement/shutting-down of a challenged cooling fan in a rack of cooling fans. In embodiments, the event response includes a second modification with respect to a second device of the set of devices. For example, an operating speed change (e.g., upward/downward) for a fully-functioning device in order to compensate for the challenged device or in order to deter damage/wear to the fully-functioning device. As such, the modifications can include a first modification which decreases a first operating speed of a first fan and a second modification which increases a second operating speed of a second fan.

In embodiments, determining the event response includes a group of operations. The set of acoustic emission data may be compared with a set of profile data at block 356. The set of profile data may be a baseline or historically-collected data for the set of devices or for a similar set of devices. Such profile data may include information related to pitch, frequency, amplitude, energy, count, timing, etc. as described herein. The set of profile data may be useful to determine a nature of a triggering event (e.g., beyond simply the existence of the triggering event). Accordingly, the set of profile data may include various thresholds or error codes which indicates (potential) reasons for the triggering event. In certain embodiments, phases or states of the devices may be considered (e.g., different acoustic emission data or different profile data for varying times, operating conditions, or external factors).

Based on the comparison, an expected service-life of the first device can be computed at block 357. The computation can include a reference to a specific record in the profile data, or an interpolation of relevant data provided therein (e.g., if the exact device is not found, then find similar devices and use an average or other mathematical derivation). The first modification with respect to operation of the first device may be identified at block 358. The first modification can be made to retool the expected service-life (e.g., number of predicted operating hours) of the first device. For example, decreasing an operating speed may extend how long the first device operates until it fails to provide a threshold amount of performance (or simply fails entirely). Identification of the modification may be made based on a selection from a group of candidate modifications (e.g., as found in the set of profile data or elsewhere, such as a manufacturer database). Historical data pertaining to what has previously been done with respect to modifications in similar systems may be utilized to identify/select an appropriate modification for a given cluster of data points.

At block 370, establishment of the event response is initiated. Accordingly, the first modification with respect to operation of the first device can be initiated/established. Initiation can include commencement, start-up, or beginning. Establishment may include constructing, structuring, forming, organizing, or introducing. Operation of the first device may be altered to adapt the first device for a lesser role with respect to an overall objective of the set of devices (e.g., if the set of devices are used to cool a group of processors then the first device may have less of an overall responsibility in cooling the group of processors after the first modification when compared to before the first modification).

In embodiments, the event response includes adjusting the first device in an incremental fashion (e.g., a unit of a particular parameter, one speed setting at a time) until the set of acoustic emission data (e.g., which may be collected/transmitted dynamically/in-real-time) indicates that a comparison of a first acoustic emission data value of the first device and a benchmark acoustic emission data value is within a threshold difference at block 364. For example, if the benchmark acoustic emission data value includes a benchmark scaled pitch of 3 (e.g., on a scale of 0 to 10), and a threshold difference scaled pitch of 1.5, a first acoustic emission data value of the first device having a first scaled pitch of 4 may be considered within a threshold difference (e.g., 4−3=1<1.5) whereas a first scaled pitch of 5 would require an additional incrementally scaled adjustment (e.g., 5−3=2>1.5). Various scales or weightings may be utilized. In embodiments, the event response includes storing a set of historical change information related to the first modification with respect to operation of the first device (e.g., in a data store or multi-dimensional array) at block 365. As such, a history of event responses and modifications may be gathered for use in predicting future events, in making future modifications, or to have a record of information to review in case of an error event which is audited.

Method 300 concludes at block 399. Aspects of method 300 may provide performance or efficiency benefits for managing a set of devices using a set of acoustic emission data. For example, aspects of method 300 may positively impact wear-rate or service-length of the set of devices. Altogether, performance or efficiency benefits for the set of device may occur (e.g., load balancing, high availability, flexibility).

Figure 4:
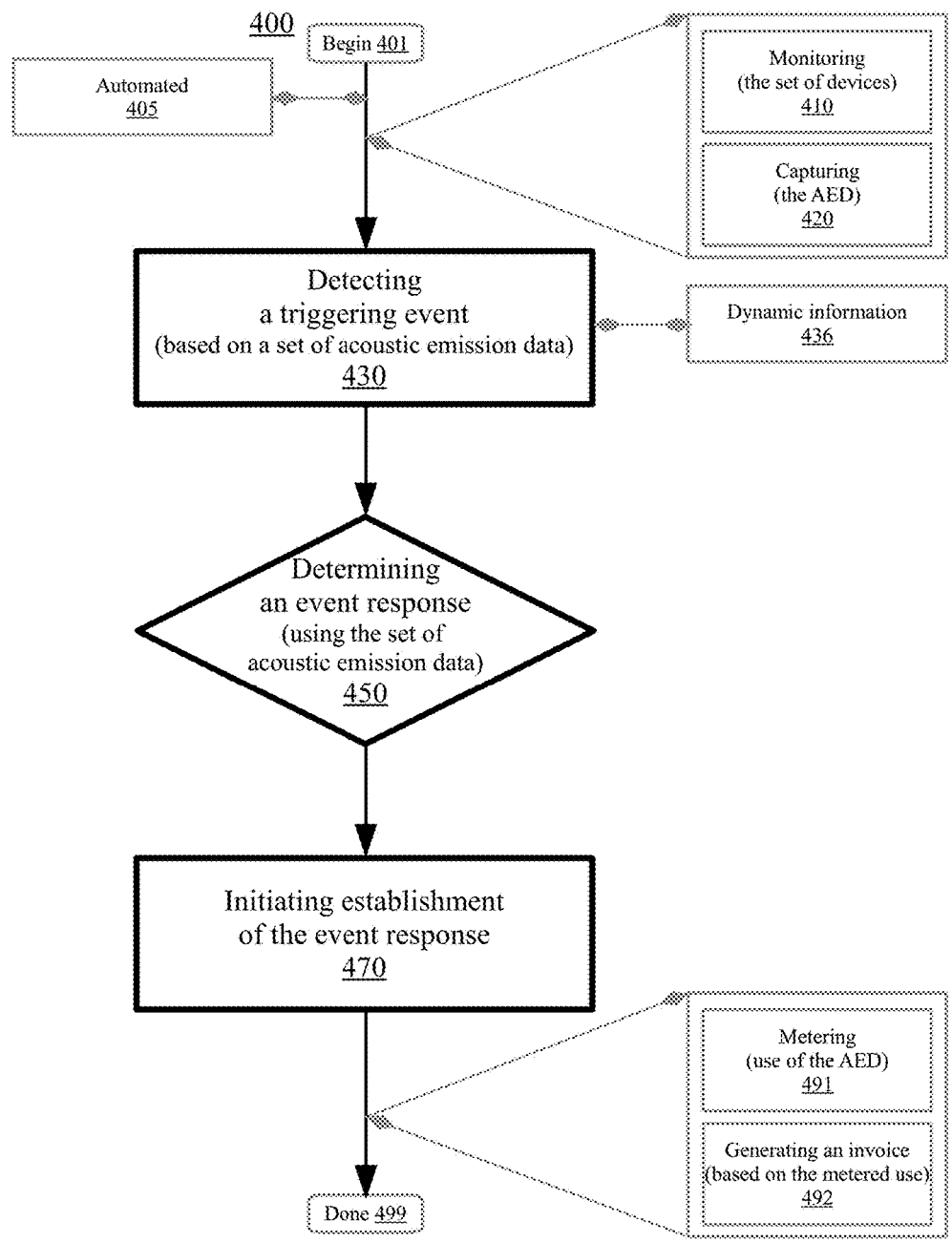
FIG. 4 is a flowchart illustrating a method for managing a set of devices using a set of acoustic emission data, according to embodiments.

FIG. 4 is a flowchart illustrating a method 400 for managing a set of devices using a set of acoustic emission data, according to embodiments. Aspects of method 400 may be similar or the same as aspects of method 300 and aspects may be utilized with other methodologies described herein (e.g., method 500, method 600). The method 400 may begin at block 401. In embodiments, an acoustic emission data manager may be used to manage a set of operations in an automated fashion (e.g., by a computer hardware processor) at block 405 without user intervention as described herein. Automation can reduce potential or actual error events, and save time of users, administrators, or technicians which can positively impact an overall computing efficiency or performance. The acoustic emission data manager may be physically located with the set of acoustic emission sensors, or may be separate (e.g., in a cloud environment or the like). As such, detecting the triggering event, determining the event response, and initiating establishment of the event response may each occur in an automated fashion without user intervention.

In embodiments, the set of devices is monitored using the set of acoustic emission sensors at block 410. Monitoring can include observing, analyzing, or identifying related to a physical component of the set of devices such as a bearing, a grease-level, a wheel/flywheel, a pump, a pulley, a ratchet, etc. In embodiments, the set of acoustic emission data is captured with respect to the set of devices at block 420. Capturing can include accumulating, aggregating, obtaining, saving, or storing associated with a sensor controller, an acoustic emission data manager, or generally in a computer system.

At block 430, a triggering event is detected (e.g., in response to the monitoring, in response to the capturing). The set of acoustic emission data can include dynamic information at block 436. As such, the set of acoustic emission data can be acquired in an on-going (e.g., real-time, streamlined) basis or periodically (e.g., once per day). Accordingly, the dynamic information may indicate a status change (e.g., device-health dips below a threshold), information adjustment (e.g., relative baseline shifting due to noise/interference from other devices), contextual shifts (e.g., amount/volume of work/power/activity being asked of the set of devices changes), or other user/environmental factors (e.g., containment apparatus/system moves to a new location/building/ventilation-system).

At block 450, an event response is determined. At block 470, establishment of the event response is initiated. In embodiments, a usage assessment may be generated with respect to the set of acoustic emission data. Use of the set of acoustic emission data may be metered at block 491. For example, service-life extensions may be measured or functional up-time relative to a benchmark (e.g., historical functional up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 492. The generated invoice may be provided (e.g., displayed in a dialog box, sent or transferred by e-mail, text message, initiated for traditional mail) to the user for notification, acknowledgment, or payment.

Method 400 concludes at block 499. Aspects of method 400 may provide performance or efficiency benefits for managing a set of devices using a set of acoustic emission data. For example, aspects of method 400 may positively impact wear-rate or service-length of the set of devices. Altogether, performance or efficiency benefits for the set of devices may occur (e.g., load balancing, high availability, flexibility).

Figure 5:
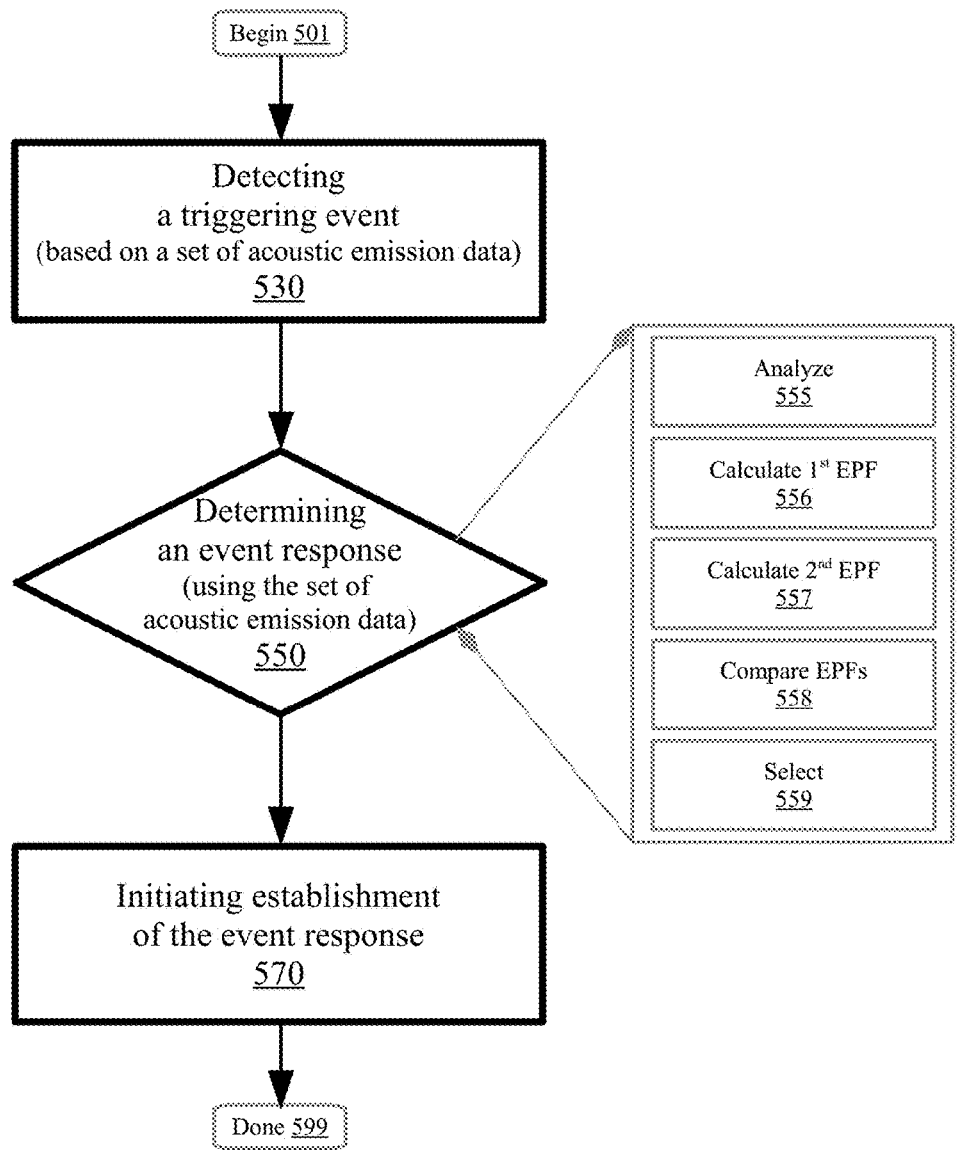
FIG. 5 is a flowchart illustrating a method for managing a set of devices using a set of acoustic emission data, according to embodiments.

FIG. 5 is a flowchart illustrating a method 500 for managing a set of devices using a set of acoustic emission data, according to embodiments. Aspects of method 500 may be similar or the same as aspects of method 300 and aspects may be utilized with other methodologies described herein (e.g., method 400, method 600). The method 500 may begin at block 501. At block 530, a triggering event is detected. At block 550, an event response is determined.

In embodiments, using the set of acoustic emission data to determine the event response includes a set of operations. The set of acoustic emission data can be analyzed at block 555. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use. Accordingly, such analysis may identify a set of candidate event responses including both a first candidate event response and a second candidate event response.

In response to such analysis, a first expected performance factor (e.g., resultant functional operating temperature/flow for changing one or more operating features/speeds) may be calculated for the first candidate event response at block 556. Also, a second expected performance factor (e.g., resultant functional operating temperature/flow for changing one or more operating features/speeds) may be calculated for the second candidate event response at block 557. The first and second expected performance factors may be compared at block 558. Based on the first expected performance factor exceeding the second expected performance factor, the first candidate event response may be selected (e.g., select the candidate event response which yields a higher performing or more efficient set of devices for the function the set of devices serve). In certain embodiments, performance factor may be measured in terms of cost-burden which may include selecting an event response which uses greater resources (e.g., more energy/voltage) but incurs a lesser ultimate cost on the user (e.g., fewer replacement components for the set of devices, fewer replacement computing components which are being cooled by a set of air moving devices). At block 570, establishment of the event response is initiated. Method 500 may have various performance or efficiency benefits (such as those described herein) and concludes at block 599.

Figure 6:
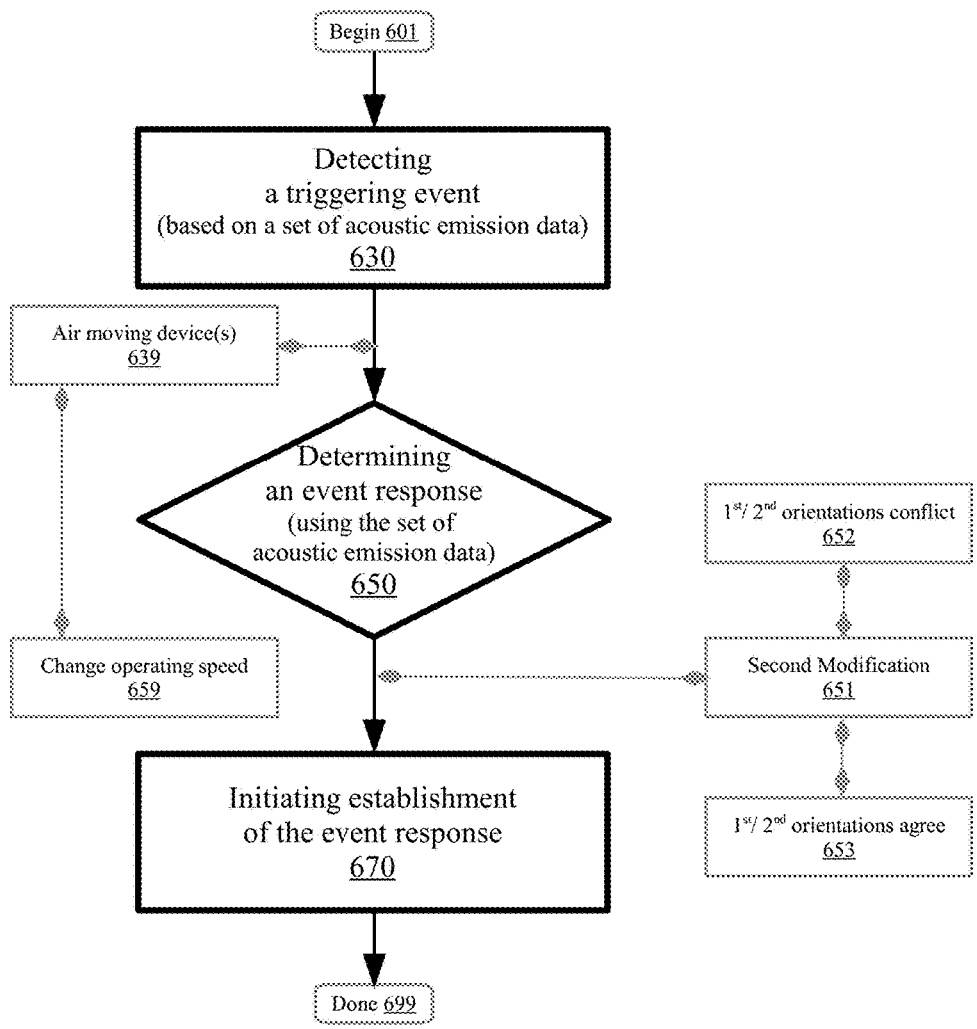
FIG. 6 is a flowchart illustrating a method for managing a set of devices using a set of acoustic emission data, according to embodiments.

FIG. 6 is a flowchart illustrating a method 600 for managing a set of devices using a set of acoustic emission data, according to embodiments. Aspects of method 600 may be similar or the same as aspects of method 300 and aspects may be utilized with other methodologies described herein (e.g., method 400, method 500). The method 600 may begin at block 601. At block 630, a triggering event is detected.

In embodiments, the set of devices includes a set of air moving devices (e.g., cooling fans for computer hardware) at block 639. At block 650, an event response is determined. In embodiments, the event response includes a second modification with respect to a second device of the set of devices (e.g., alter settings on both a first device and a second device) at block 651. In certain embodiments, the first modification includes a decrease in an operating speed of the first device at block 659. In various embodiments, a first orientation of the first modification conflicts-with a second orientation of the second modification at block 652. For example, when the first modification is oriented as a decrease then the second modification is oriented as an increase (e.g., a compensatory response to maintain the ultimate functional purpose of the set of devices, decreasing speed of a first fan and increasing speed of a second fan). In various embodiments, a first orientation of the first modification agrees with a second orientation of the second modification at block 653. For instance, when the first modification is oriented as a decrease then the second modification is also oriented as a decrease (e.g., a response to delay/avoid/deter similar challenges/wear on the second device as faced with the first device).

In addition to air moving devices which has been used as an example, disclosed aspects may relate to various technical domains. In certain embodiments, the set of devices includes a set of grain drying devices (e.g., corn dryers). As such, the first modification may include a selection from a group consisting of at least one of: a decrease in an operating speed of the first device related to an aeration rate, a decrease in a temperature configuration of the first device, a decrease in a moisture-reduction rate of the first device, or a decrease in an energy-usage rate of the first device. In certain embodiments, the set of devices includes a set of refrigeration devices (e.g., meat locker or grocery store refrigerator/freezers). As such, the first modification may include a selection from a group consisting of at least one of: a decrease in an operating speed of the first device related to a chilling rate, a decrease in a temperature configuration of the first device, or a decrease in an energy-usage rate of the first device. In certain embodiments, the set of devices may include a set of motorized devices (e.g., to drive/propel a sled/apparatus/vehicle). As such, the first modification may include a selection from a group consisting of at least one of: a decrease in an operating speed of the first device related to a throttle rate, a decrease in a temperature configuration of the first device, or a decrease in an energy-usage rate of the first device. In certain embodiments, the set of devices include a set of fluid pumping devices (e.g., oil pipeline, water pumping for irrigation/flood-relief). As such, the first modification includes a selection from a group consisting of at least one of: a decrease in an operating speed of the first device related to a flow-rate, or a decrease in an energy-usage rate of the first device. At block 670, establishment of the event response is initiated. Method 600 may have various performance or efficiency benefits (e.g., load balancing, high availability, flexibility) and concludes at block 699.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a set of devices using a set of acoustic emission data which indicates device-health of the set of devices, comprising:
    detecting, based on the set of acoustic emission data, a triggering event related to a first device of the set of devices, wherein the set of devices is coupled with a set of acoustic emission sensors;
    determining, using the set of acoustic emission data, an event response which includes a first modification with respect to operation of the first device;
    analyzing the set of acoustic emission data to identify a set of candidate event responses including both a first candidate event response and a second candidate event response;
    calculating a first expected performance factor for the first candidate event response;
    calculating a second expected performance factor for the second candidate event response;
    comparing the first and second expected performance factors;
    selecting, based on the first expected performance factor exceeding the second expected performance factor, the first candidate event response; and
    initiating establishment of the first candidate event response which includes the first modification with respect to operation of the first device.

2. The method of claim 1, wherein the set of acoustic emission data includes dynamic information and further comprising:
    monitoring, using the set of acoustic emission sensors, the set of devices; and
    capturing, with respect to the set of devices, the set of acoustic emission data.

3. The method of claim 1, wherein the detecting, the determining, and the initiating each occur in an automated fashion without user intervention, and wherein the set of acoustic emission data includes dynamic information.

4. The method of claim 1, wherein the triggering event includes a threshold difference between a first acoustic emission data value of the first device and a benchmark acoustic emission data value.

5. The method of claim 1, wherein determining, using the set of acoustic emission data, the event response which includes the first modification with respect to operation of the first device includes:
   comparing the set of acoustic emission data with a set of profile data;
   computing, based on the comparison, an expected service-life of the first device; and
   identifying, to retool the expected service-life of the first device, the first modification with respect to operation of the first device.

6. The method of claim 1, wherein the first candidate event response includes a second modification with respect to a second device of the set of devices.

7. The method of claim 6, wherein a first orientation of the first modification conflicts-with a second orientation of the second modification.

8. The method of claim 6, wherein a first orientation of the first modification agrees-with a second orientation of the second modification.

9. The method of claim 1, wherein the first candidate event response includes:
   adjusting the first device in an incremental fashion until the set of acoustic emission data indicates that a comparison of a first acoustic emission data value of the first device and a benchmark acoustic emission data value is within a threshold difference; and
   storing, in a data store, a set of historical change information related to the first modification with respect to operation of the first device.

10. The method of claim 1, wherein the set of devices includes a set of air moving devices.

11. The method of claim 10, wherein the first modification includes a decrease in a first operating speed of the first device, wherein the event response includes a second modification with respect to a second device of the set of devices, and wherein the second modification includes an increase in a second operating speed of the second device.

12. A system for managing a set of devices using a set of acoustic emission data which indicates device-health of the set of devices, the system comprising:
   a memory having a set of computer readable computer instructions, and
   a processor for executing the set of computer readable instructions, the set of computer readable instructions including:
   detecting, based on the set of acoustic emission data, a triggering event related to a first device of the set of devices, wherein the set of devices is coupled with a set of acoustic emission sensors;
   determining, using the set of acoustic emission data, an event response which includes a first modification with respect to operation of the first device;
   analyzing the set of acoustic emission data to identify a set of candidate event responses including both a first candidate event response and a second candidate event response;
   calculating a first expected performance factor for the first candidate event response;
   calculating a second expected performance factor for the second candidate event response;
   comparing the first and second expected performance factors;
   selecting, based on the first expected performance factor exceeding the second expected performance factor, the first candidate event response; and
   initiating establishment of the first candidate event response which includes the first modification with respect to operation of the first device.

13. The system of claim 12, wherein the set of acoustic emission data includes dynamic information and further comprising:
   monitoring, using the acoustic emission sensors, the set of devices; and
   capturing, with respect to the set of devices, the set of acoustic emission data.

14. The system of claim 12, wherein the detecting, the determining, and the initiating each occur in an automated fashion without user intervention, and wherein the set of acoustic emission data includes dynamic information.

15. The system of claim 12, wherein the triggering event includes a threshold difference between a first acoustic emission data value of the first device and a benchmark acoustic emission data value.

16. The system of claim 12, wherein determining, using the set of acoustic emission data, the event response which includes the first modification with respect to operation of the first device includes:
   comparing the set of acoustic emission data with a set of profile data;
   computing, based on the comparison, an expected service-life of the first device; and
   identifying, to retool the expected service-life of the first device, the first modification with respect to operation of the first device.

17. The system of claim 12, wherein the first candidate event response includes:
   adjusting the first device in an incremental fashion until the set of acoustic emission data indicates that a comparison of a first acoustic emission data value of the first device and a benchmark acoustic emission data value is within a threshold difference; and
   storing, in a data store, a set of historical change information related to the first modification with respect to operation of the first device.

18. A computer program product for managing a set of devices using a set of acoustic emission data which indicates device-health of the set of devices, the computer program product comprising a computer readable storage medium having program instructions embodied therewith, wherein the computer readable storage medium is not a transitory signal per se, the program instructions executable by a processor to cause the processor to perform a method comprising:
   detecting, based on the set of acoustic emission data, a triggering event related to a first device of the set of devices, wherein the set of devices is coupled with a set of acoustic emission sensors;
   determining, using the set of acoustic emission data, an event response which includes a first modification with respect to operation of the first device;
   analyzing the set of acoustic emission data to identify a set of candidate event responses including both a first candidate event response and a second candidate event response;
   calculating a first expected performance factor for the first candidate event response;
   calculating a second expected performance factor for the second candidate event response;

comparing the first and second expected performance factors;

selecting, based on the first expected performance factor exceeding the second expected performance factor, the first candidate event response; and initiating establishment of the first candidate event response which includes the first modification with respect to operation of the first device.

19. The computer program product of claim 18, wherein at least one of:

the program instructions are stored in a computer readable storage medium in a data processing system, and wherein the program instructions were downloaded over a network from a remote data processing system; or the program instructions are stored in a computer readable storage medium in a server data processing system, and wherein the program instructions are downloaded over a network to a remote data processing system for use in a computer readable storage medium with the remote data processing system.

\* \* \* \* \*